United States Patent
De Rycke et al.

(10) Patent No.: US 11,060,342 B2
(45) Date of Patent: Jul. 13, 2021

(54) VACUUM INSULATED GLAZING UNIT

(71) Applicant: VKR Holding A/S, Hørsholm (DK)

(72) Inventors: Thibault De Rycke, Hørsholm (DK); Carsten Rud Jensen, Hørsholm (DK)

(73) Assignee: VKR HOLDING A/S, Hørsholm (DK)

(*) Notice: Subject to any disclaimer, the term of this patent is extended or adjusted under 35 U.S.C. 154(b) by 0 days.

(21) Appl. No.: 16/485,877

(22) PCT Filed: Feb. 13, 2018

(86) PCT No.: PCT/EP2018/053588
§ 371 (c)(1),
(2) Date: Aug. 14, 2019

(87) PCT Pub. No.: WO2018/149836
PCT Pub. Date: Aug. 23, 2018

(65) Prior Publication Data
US 2020/0040645 A1 Feb. 6, 2020

(30) Foreign Application Priority Data
Feb. 17, 2017 (DK) .............................. PA201770113

(51) Int. Cl.
E06B 3/66 (2006.01)
B23K 1/00 (2006.01)
(Continued)

(52) U.S. Cl.
CPC .......... E06B 3/6612 (2013.01); B23K 1/0008 (2013.01); B32B 17/06 (2013.01);
(Continued)

(58) Field of Classification Search
CPC .. E06B 3/6612; E06B 3/3775; E06B 3/66357; E06B 3/66333; E06B 2003/66338; E06B 3/6775; Y02B 80/24
See application file for complete search history.

(56) References Cited

U.S. PATENT DOCUMENTS 6,054,195 A * 4/2000 Collins ............... B32B 37/0076
428/34
8,984,909 B2 * 3/2015 Li ....................... E06B 3/67326
65/34
(Continued)

FOREIGN PATENT DOCUMENTS

AT 14327 U1 8/2015
CN 203999340 U 12/2014
(Continued)

OTHER PUBLICATIONS

International Search Report for corresponding application PCT/EP2018/053588 filed Feb. 13, 2018; dated Apr. 4, 2018.

Primary Examiner — Donald J Loney
(74) Attorney, Agent, or Firm — Cantor Colburn LLP

(57) ABSTRACT

A method of producing A vacuum insulated glazing (VIG) unit, including providing a supporting structure and a solid pre-form of port soldering material provided with an opening, the supporting structure resting on the outer surface of the first pane of the VIG unit and extending over the opening of the evacuation hole, evacuating the void through the evacuation hole; and heating the port soldering material to a condition where it flows and merges across the evacuation hole while the supporting structure substantially maintain its position; and subsequently cooling the port soldering material to a solid condition so as to provide a gastight port seal forming a continuous body across the evacuation hole and preventing passage of gas to the void through the evacuation hole, and so that the port seal bonds to the outer surface of the first pane in a pattern that encloses the evacuation hole.

10 Claims, 16 Drawing Sheets

(51) Int. Cl.
  *B32B 17/06* (2006.01)
  *E06B 3/663* (2006.01)
  *E06B 3/677* (2006.01)
  *B23K 103/00* (2006.01)
(52) U.S. Cl.
  CPC ...... *E06B 3/66333* (2013.01); *E06B 3/66357* (2013.01); *E06B 3/6775* (2013.01); *B23K 2103/54* (2018.08); *E06B 2003/66338* (2013.01)

(56) References Cited

U.S. PATENT DOCUMENTS

| | | |
|---|---|---|
| 2012/0148795 A1 | 6/2012 | Kwon |
| 2013/0059087 A1 | 3/2013 | Veerasamy |
| 2013/0059160 A1 | 3/2013 | Verrasamy |
| 2015/0218877 A1 | 8/2015 | Kawahara |

FOREIGN PATENT DOCUMENTS

| | | |
|---|---|---|
| CN | 204298240 U | 4/2015 |
| CN | 204298258 U | 4/2015 |
| CN | 204298259 U | 4/2015 |
| CN | 204298260 U | 4/2015 |
| DE | 102011122334 A1 | 7/2013 |
| EP | 1013869 A1 | 6/2000 |
| EP | 1160217 A1 | 12/2001 |
| EP | 1422204 A1 | 5/2004 |
| FR | 2774373 A1 | 8/1999 |
| WO | 0227135 A1 | 4/2002 |
| WO | 2016027750 A1 | 2/2016 |
| WO | 2016144857 A1 | 9/2016 |

\* cited by examiner

VACUUM INSULATED GLAZING UNIT

TECHNICAL FIELD

The present disclosure relates to a method of producing a vacuum insulated glazing (VIG) unit, a VIG unit and a bonded assembly for providing to an evacuation hole in a glass pane of a VIG unit.

BACKGROUND

When manufacturing vacuum insulated glazing (VIG) units, a sealable closure of the evacuation hole into the void formed inside the units between the parallel glass panes of it is provided, typically in the form of a soldering material that is heated to form a gas tight seal around an evacuation tube through which the void is evacuated, after which the outer tip of the tube is sealed off to effectively close the access to the void. Such methods are disclosed in e.g. EP 1 422 204 and in US 2012/148795, where the evacuation hole is manufactured as a stepped hole where a glass tube is inserted in the upper and wider part of the hole and is resting on the horizontal annulus separating the upper part of the hole from the lower part, which has a diameter being less that the diameter of the glass tube. After the seal is formed around the glass tube and the void has been evacuated, the distal tip of the glass tube is heated to its melting point to form a closure of the glass tube and thereby to seal off the evacuated void.

In another method to seal off the evacuation hole, also disclosed in US 2012/148795, the vent port seal has no protruding evacuation tube; the outer part of the evacuation hole has instead a funnel-shape so that the opening at the outer surface of the pane is the widest of the evacuation hole. A port soldering material is provided in the form of a ring of a solid pre-form of a solder glass frit, which is situated in the outer, funnel-shaped part of the evacuation hole without an evacuation tube. After the evacuation of the void, the port soldering material is heated so that it is converted into a fluid and the evacuation hole is closed by the port soldering material collapsing after being heated, where after it is cooled and is solidified to become a seal.

BRIEF SUMMARY

For a number of different applications, it is preferred that the inner diameter of the evacuation hole exceeds the outer diameter of the evacuation tube, in particularly in VIG units where the panes of glass are made from tempered glass. As a rule of thumb, the inner diameter of a through-hole in a pane of glass to be tempered for mounting of load-bearing connections to the pane, such as hinges or for suspension of the glass pane, should be at least equal to the thickness of the pane in order to ensure that the tempering of the glass is correctly executed throughout the pane including the areas close to the hole. It has been found by the present inventors that the same practice should be followed for the evacuation hole in a pane of the VIG unit although the hole by no means will be load bearing, as the risk of formation and growth of cracks near the evacuation hole will increase over time if the diameter of the evacuation hole is significantly smaller than the thickness of the pane, leading to a reduced durability of the VIG unit as the cracks will tend to reduce the vacuum in the void and thus the insulating effect of the VIG unit. Thus, in order to increase the durability of the VIG unit, the diameter of the evacuation hole should be at least the same as the thickness of the pane in which the evacuation hole is formed, which normally is at least 3 millimeters but preferably at least 4 millimeters in order to be able to withstand the pressure difference between the evacuated void and the ambient atmospheric pressure.

With the term tempered glass pane is herein understood glass panes in which compressive stresses have been introduced in the surface of the glass pane, and the center of the glass pane consequently is subject to tensile stress. For glass to be considered tempered this compressive stress on the surface of the glass should be a minimum of 69 MPa (10,000 psi) and is usually higher than 95 MPa and up to about 150 MPa.

Tempered glass, also known as toughened glass, may be produced from annealed glass by means of a strengthening procedure, which e.g. may be a heat tempering, a chemically tempering or plasma tempering with the purpose of introducing the compressive stresses into the surfaces of the glass pane. Other types of tempering of glass include ion treatment or bombardment of the glass pane surfaces with large atoms, which becomes embedded in the surface deposition of material on the glass pane surface by means of surface treatment or bombardment and surface chemical reactions for obtaining the compressive stresses at the glass pane surface.

Thermally tempered glass may be produced by means of a furnace in which the annealed glass is heated to a temperature of approximately 700° C., after which the glass pane is rapidly cooled. The cooling introduces the compressive stresses into the glass pane surface.

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions which cause the material at the glass pane surfaces to be in a compressed state.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium or magnesium ions, whereby the replacement ions are driven into the opposing surfaces of the glass pane so as to increase the strength of the pane. Methods of plasma tempering are disclosed e.g. in US 2013/0059087 A1 and in US 2013/0059160 A1.

After tempering, the stress pattern developed by the glass is high, and the mechanical strength of tempered glass is typically four to five times higher than that of annealed glass.

The evacuation tube free solution disclosed in US 2012/148795 as discussed previously has the advantages of being less susceptible to damage by external impacts to the VIG unit as no protruding remain of the evacuation tube is at risk of being fractured so that a leak may be created between the environment and the void inside the VIG unit. However, with a smallest diameter of the evacuation hole being relatively large, of e.g. 4 millimeters, the effect of the surface tension of the flowing port soldering material is reduced, and there will be a significantly higher risk that the flowing port soldering material will flow down into the evacuation hole or even into the void as compared to holes of smaller diameters, and the sealing effect and durability of the port seal will be less reliable.

By providing the supporting structure, preferably in a material that is substantially shape-stable in the temperature range that the port soldering material must be heated to in order to flow and create the port seal, it is achieved that the port soldering material when heated to a flowing state will be substantially contained at the intended position and will, when cooled to a solid state, provide the port seal that is required for the VIG unit to remain gas tightly sealed off from the environment.

Thus, the predictability of the outcome of heating the port soldering material to a temperature where it flows is increased by means of providing the support structure, which provides for an improved sealing of the evacuation hole by means of the port seal. Hereby it is achieved that tempered glass panes may be used for VIG units with evacuation holes of a sufficiently large diameter for the glass pane near the evacuation hole to be correctly tempered and thereby obtain an improved durability of the VIG unit.

Thus, the present disclosure relates to a method of producing a vacuum insulated glazing (VIG) unit comprising the steps of:
  providing first and second substantially parallel, preferably of tempered glass, a plurality of pillars and a peripheral seal provided between the first and second panes, where in the first pane there is provided an evacuation hole for evacuating a void formed between said panes through the evacuation hole to a pressure less than atmospheric pressure;
  providing on an outer surface, preferably an upward-facing outer surface, of the first pane a supporting structure and a port soldering material, the supporting structure resting on the outer surface of the first pane and extending over the opening of the evacuation hole;
  evacuating the void through the evacuation hole; and
  heating the port soldering material to a condition where it flows and merges across the evacuation hole while the supporting structure substantially maintain its position; and
  subsequently cooling the port soldering material to a solid condition so as to provide a gastight port seal forming a continuous body across the evacuation hole and preventing passage of gas to the void through the evacuation hole, and so that the port seal bonds to the outer surface of the first pane in a pattern that encloses the evacuation hole, wherein the port soldering material is provided in the form of a solid pre-form of glass solder frit with an opening provided therein for allowing a flow of gas out from the evacuation hole that is closed during said heating of the port soldering material due to the port soldering material flowing and merging across the evacuation hole. The port soldering material may in particular be provided in a disc-shape.

The flowing port soldering material will flow and merge across the evacuation hole, i.e. so that the evacuation hole is covered by the fluid port soldering material, which also flows into contact with the outer surface of the first pane in a pattern or outer circumference of the fluid port soldering material that encloses the evacuation hole, whereby the outer surface of the fluid port soldering material forms one continuous surface delimited by the edge of the body of fluid port soldering material, which edge is in contact with the outer surface of the first pane.

The pillars are provided for ensuring a distance between the inner surfaces of the two panes in the order of e.g. 0.2 millimeters. Such high-strength pillars or spacers are well known in the prior art from e.g. WO 2016/027750 and WO 2016/144857 and may be provided as a glass frit paste that is printed onto the inner surface of one of the two panes and subsequently heated to form the pillars as shown in e.g. AT 14327 U.

The peripheral seal provided between the first and second panes may preferably be made from a soldering material containing glass solder frit with a low melting temperature, which by means of a thermal treatment is turned into a gas tight peripheral seal as known from e.g. WO 02/27135 and EP 1 422 204. Alternatively, other materials may be employed, such as a metal band seal as disclosed e.g. in US 2015/218877.

The void between the panes is preferably evacuated to a vacuum with a pressure of 0.001 millibar or less in order to ensure a suitable insulating effect of the VIG unit.

The port soldering material may a glass solder frit paste with a low melting temperature, where the paste further comprises of about 70 wt %, an organic binder, inorganic fillers and solvents, for example water or alcohol based. Such paste is well known from the prior art. Alternatively, the port soldering material may be a solid entity, e.g. in the form of a solid disc comprising a low melting glass solder frit, which is also well-known in the art. As an alternative, the port soldering material may comprise a metal alloy with a melting point sufficiently low, such as in the range of 300 to 360° C. so that the port soldering material can be heated to a flowing state to form the port seal without having an excessive adverse effect on the tempering of the first pane.

Generally, the port soldering material should have properties to be able flow to form the port seal at a temperature in the range of 150 to 550° C., preferably in the range of 300 to 400° C.

The port seal bonds to the first pane in a pattern that encloses the evacuation hole so as to provide a gas proof seal between the first pane and the evacuation hole.

The supporting structure is preferably made from a metal or a metal alloy, preferably selected from titanium, stainless steel, nickel plated copper and an iron-nickel-cobalt alloy. The alloy has preferably a nominal composition, by weight, of about 29% nickel, 17% cobalt and the balance iron. This alloy is commonly referred to by the trademark Kovar, other trademarks associated therewith include 'Sealvar, Nilo-K, and Therlo. Suitable alloys with similar, but not identical, compositions include Fernico (28 Ni, 18 Co) and Rodar (0.30 Mn). These materials have thermal expansion coefficients that match those of the first glass pane to an extent that is agreeable with a sufficient durability of the sealing of the evacuation hole. Of these, titanium is preferred for its excellent match in thermal expansion coefficient with that of glass. In an alternative, the supporting structure is made from a glass material, such as a sheet of glass. The thickness of the supporting structure is preferably in the range of 0.3 to 0.8 millimeters.

It is preferred that the thermal expansion coefficient of the supporting structure is substantially the same as for the port seal and/or substantially the same as for the first pane, which means within 20% of each other, preferably within about 10%.

The supporting structure may in a preferred example be formed with a first structure which is suited for engaging with the evacuation hole so as to ensure a correct horizontal positioning of the supporting structure with respect to the evacuation hole The first structure may be provided by the molding of the supporting structure or by embossing the (metal) supporting structure. Alternatively, the first structure may be provided by soldering, welding or gluing the structure(s) to a flat element of the supporting structure.

The supporting structure is preferably provided in the form of a perforated foil, wherein the perforation allows for passage of gas through the evacuation hole prior to the heating of the port soldering material.

The thickness of the first pane is preferably in the range of 3 to 6 millimeters and the thickness of the second pane is preferably within the same range.

The smallest internal diameter of the evacuation hole is preferably at least 2.5 millimeters, more preferred in the range of 3.5 to 8 millimeters.

The port soldering material comprises preferably a low-melting temperature glass solder frit and is substantially lead-free.

The port soldering material is preferably of a type that needs to be heated to a temperature in the range or 300 to 550° C. to reach a condition where it will flow, preferably in the range of 330 to 400° C.

In a second aspect, the present disclosure relates to a vacuum insulated glazing (VIG) unit comprising:
    first and second substantially parallel panes of glass, preferably of tempered glass, a plurality of pillars and a peripheral seal provided between the first and second panes, where in the first pane there is provided an evacuation hole;
    an gastight port seal bonding to the outer surface of the first pane in a pattern that encloses the evacuation hole and forming a continuous body across said evacuation hole and preventing passage of gas to the void between the first and second panes; and
    a supporting structure supporting on the outer surface of the first pane and extending over the opening of the evacuation hole, the supporting structure being shape-stable at the melting point of the material of the seal.

In a third aspect of the present disclosure, it relates to a bonded assembly for providing to an evacuation hole in a glass pane of a vacuum insulated glazing (VIG) unit, the assembly comprising
    a supporting structure bonded with a solid pre-form of port soldering material with an opening provided therein,
    wherein the supporting structure is adapted for resting on a pane of the vacuum insulated glazing (VIG) unit and have an extent parallel to the pane of at least 3.5 millimeters, preferably in the range of 5 to 10 millimeters,
    wherein the supporting structure allows for passage of gas through the evacuation hole and the solid pre-form,
    wherein the supporting structure is shape-stable at the melting point of the port soldering material, and
    wherein the assembly is adapted for being provided to an evacuation hole in a glass pane of a vacuum insulated glazing (VIG) unit by heating the port soldering material to a condition where it will flow and merge across the evacuation hole while the supporting structure substantially maintain its position; and subsequently cooling the port soldering material to a solid condition so as to provide a gastight port seal forming a continuous body across the evacuation hole and preventing passage of gas to the void through the evacuation hole, and so that the port seal bonds to the outer surface of the first pane in a pattern that encloses the evacuation hole.

In a fourth aspect, it may relate to a method of producing a vacuum insulated glazing unit comprising the steps of:
    providing first and second substantially parallel panes of glass, a plurality of pillars and a peripheral seal provided between the first and second panes, where in the first pane there is provided an evacuation hole for evacuating a void formed between said panes through the evacuation hole to a pressure less than atmospheric pressure;
    providing on an outer surface of the first pane a supporting structure and a port soldering material, the supporting structure resting on the outer surface of the first pane and extending over the opening of the evacuation hole;
    evacuating the void through the evacuation hole; and
    heating the port soldering material to a condition where it flows and merges across the evacuation hole while the supporting structure substantially maintain its position; and
    subsequently cooling the port soldering material to a solid condition so as to provide a gastight port seal forming a continuous body across the evacuation hole and preventing passage of gas to the void through the evacuation hole, and so that the port seal bonds to the outer surface of the first pane in a pattern that encloses the evacuation hole. The supporting structure is preferably provided in the form of a perforated foil, wherein the perforation allows for passage of gas through the evacuation hole prior to the heating of the port soldering material.

This method according to the fourth aspect may e.g. be combined with one or more features3.

BRIEF DESCRIPTION OF THE DRAWINGS

Examples of the present disclosure are shown in the enclosed drawing of which

The examples shown in the figures are not to scale and are to be regarded as sketches demonstrating the principles of the examples of the present disclosure.

DETAILED DESCRIPTION

Figure 1:
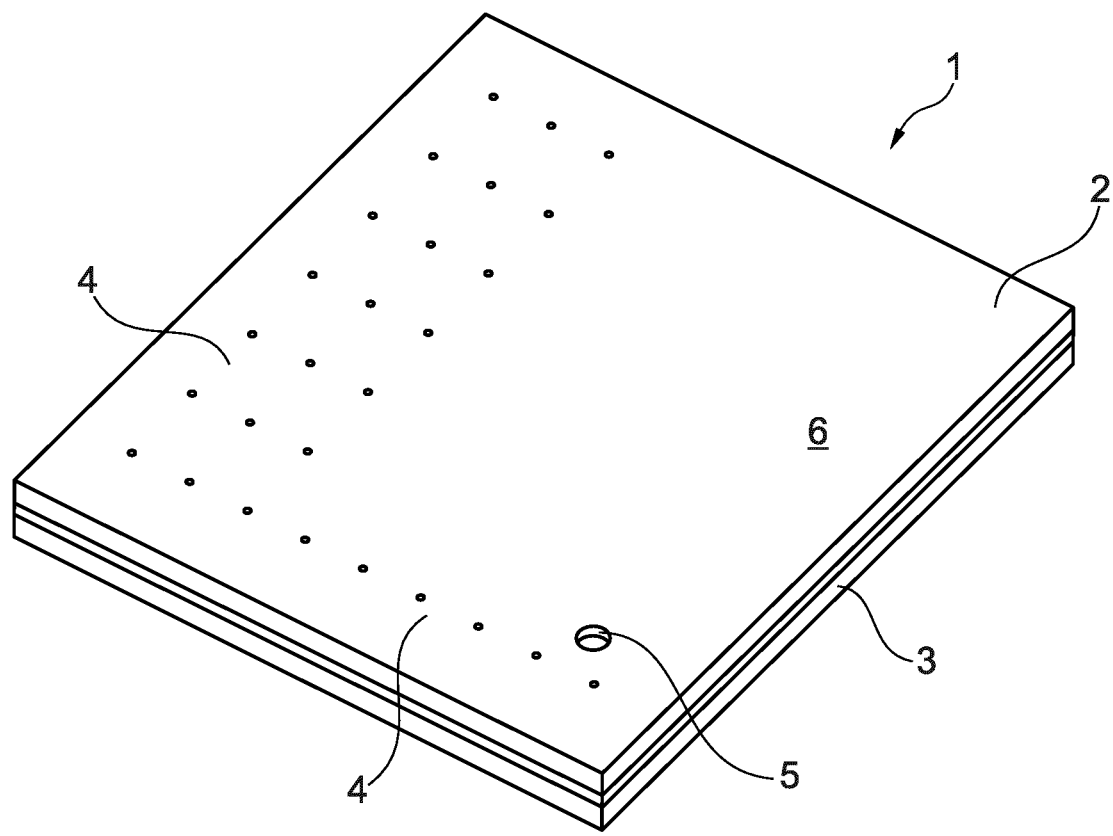
FIG. 1 is a view in perspective of a vacuum insulated glazing (VIG) unit.

The vacuum insulated glazing (VIG) unit 1 of FIG. 1 comprises two parallel panes 2, 3 of tempered glass with a plurality of pillars 4 arranged between the two panes 2, 3 in order to provide a separation of the panes 2, 3 in the order of 0.2 millimeters. The periphery between the panes 2, 3 is provided with a gas proof sealing so that the void 7 formed between the two panes 2, 3 may be evacuated to a vacuum in the order of 0.001 millibar or even less. An evacuation hole 5 is provided in the upper surface 6 of the first pane 2 and through the pane 2 for evacuation of the void 7.

In order to be able to seal off the evacuation hole 5 after evacuation of the void 7, the first pane 2 is provided with a supporting structure 8 and a port soldering material 9 as shown in FIGS. 2 to 7. The supporting structure 8 rests on the first pane 2 and extends over the opening of the evacuation hole 5 in the upper surface 6 of the first pane 2. The port soldering material 9 is provided with an opening 22 which is in correspondence with the evacuation hole 5 so that evacuation of the void 7 via the opening 22 of the port soldering material is enabled.

The smallest diameter d1 of the evacuation hole 5 is defined by the fact that the pane 2 is tempered glass of a thickness t1 of normally at least 4 millimeters in order to be able to withstand the pressure difference between the atmospheric pressure on the outside and the vacuum in the void 7. As mentioned previously, the inner diameter of the through-hole in a pane of glass that is to be tempered should be at least equal to the thickness t1 of the pane in order to ensure that the tempering of the glass is correctly executed throughout the pane including the areas close to the hole for the VIG unit to be durable.

Figure 2:
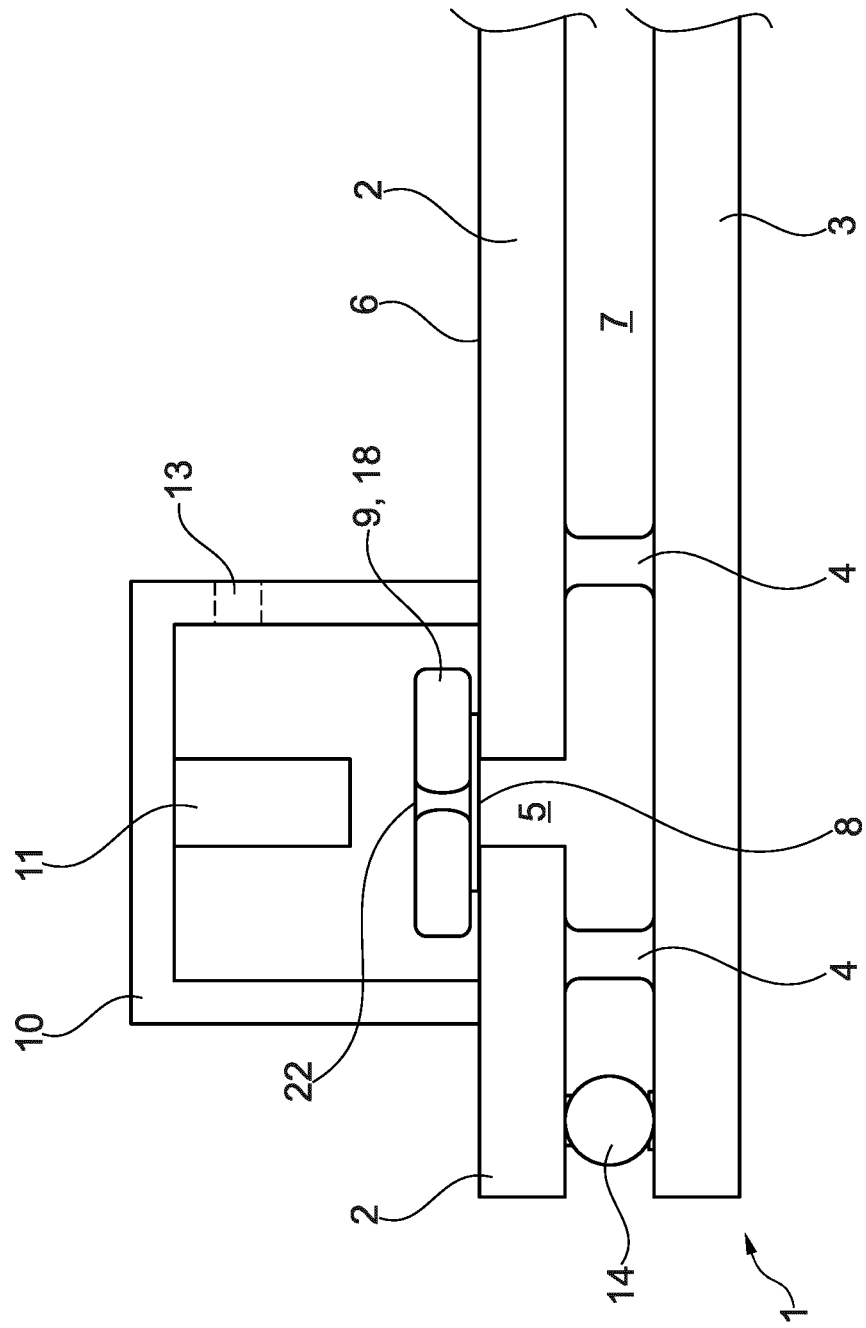
FIG. 2 is a cross-sectional view of a first example of the disclosure before the port soldering material has been heated.
Figure 3:
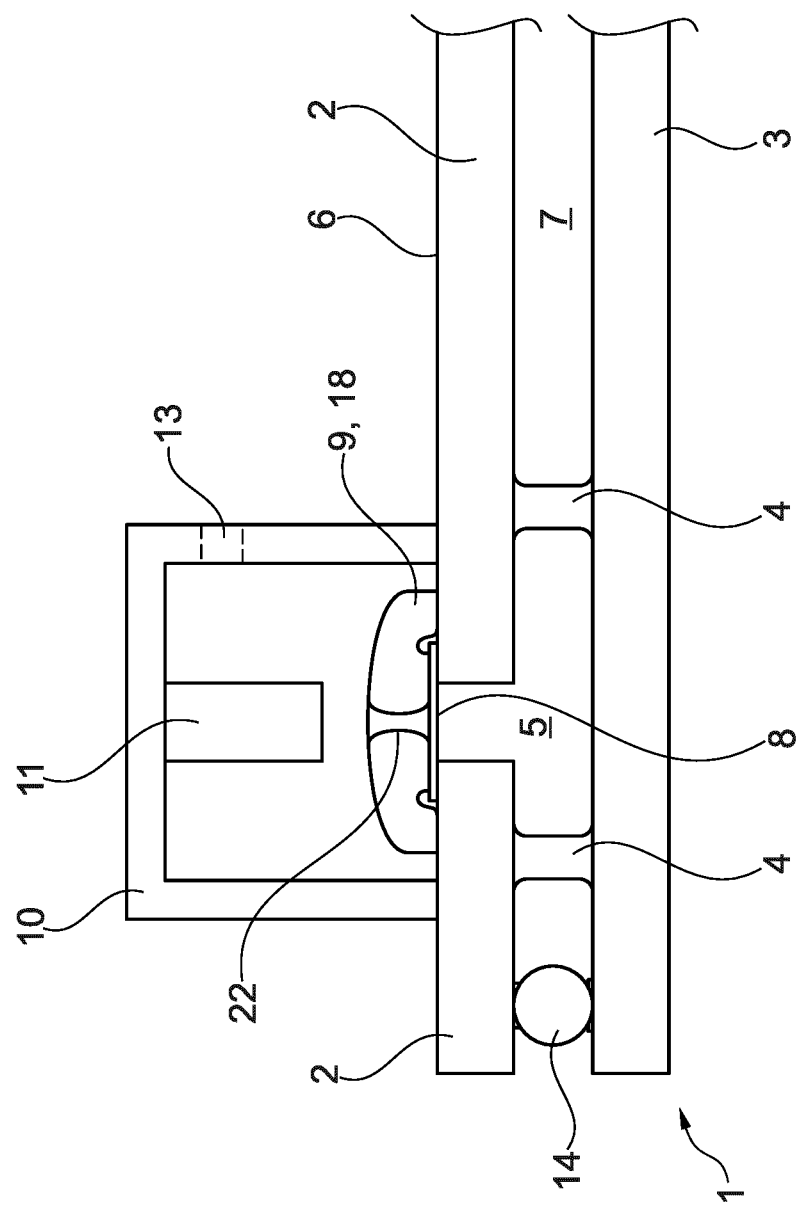
FIG. 3 is a cross-section of the example of FIG. 2, wherein the port soldering material has been heated to merge over the opening of the evacuation hole.
Figure 4:
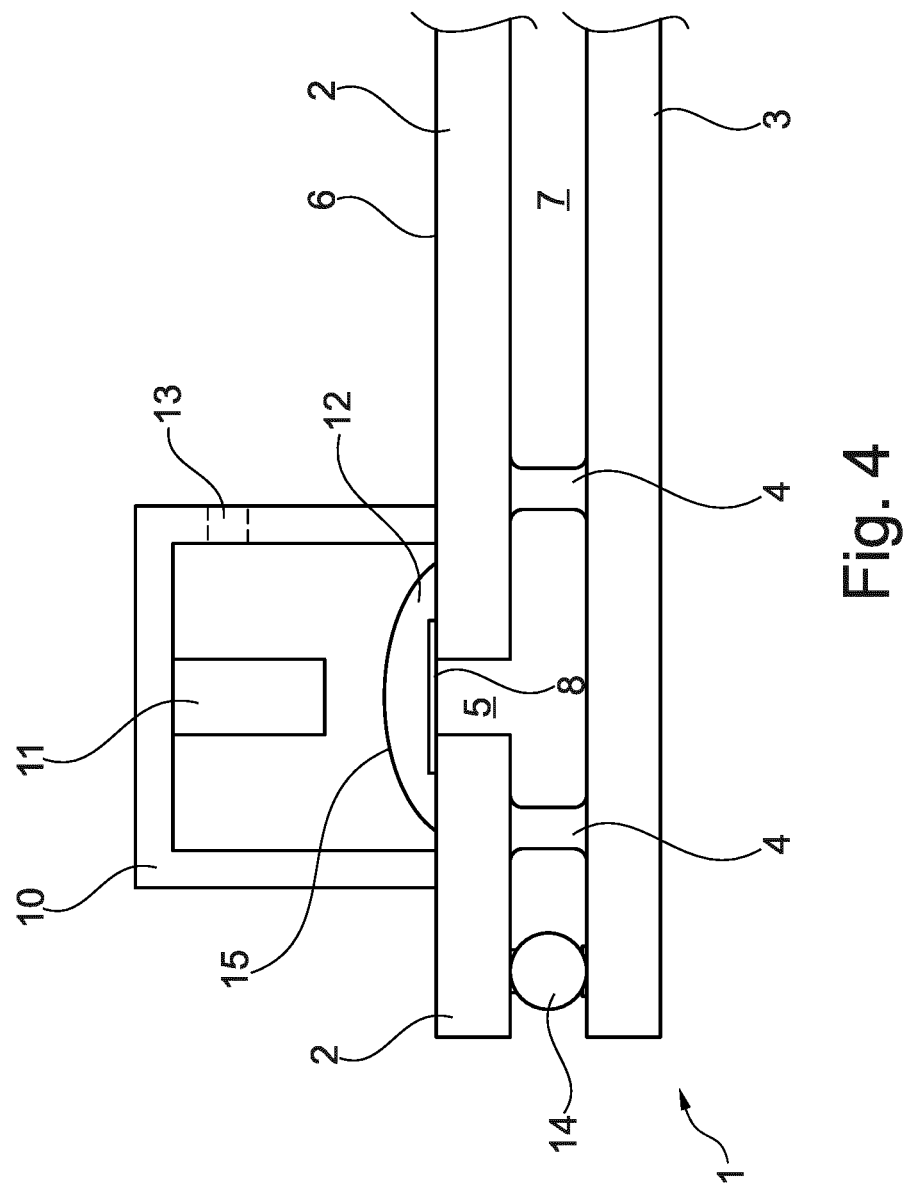
FIG. 4 is a cross-section of the example of FIGS. 2 and 3, wherein the port soldering material has been cooled off to form a port seal.

The evacuation of the void 7 is by means of an evacuation head 10 as shown in FIGS. 2 to 4 which is arranged around the evacuation hole 5 in a gas tight manner, and the heating of the port soldering material 9 in order for it to flow and merge over the opening of the evacuation hole 5 form a port seal 12 that forms a continuous body from the edge thereof 16 so as to seal the evacuation hole 5 after the evacuation of the void 7 is performed by means of a heating element 15 right above the port soldering material 9.

In a first step of the process as shown in FIG. 2, the supporting structure 8 and the port soldering material 9 is situated on the upper surface 6 of the first pane 2 so that the supporting structure 8 rests on the upper surface 6 and the port soldering material 9 is resting on the supporting structure 8. The supporting structure 8 and the port soldering material 9 is preferably provided as a bonded assembly 19, where the port soldering material 9 is a solid pre-form containing a low-temperature glass solder frit as described below. The evacuation head 10 is situated on top of the upper surface 6 covering the evacuation hole 5 as well as the supporting structure 8 and the port soldering material 9.

Prior to the evacuation of the void 7, the peripheral seal 14 is provided between the two panes 2, 3 of tempered glass. The peripheral seal 14 may be made from a soldering material containing glass solder frit with a low melting temperature, which by means of a thermal treatment is turned into a gas tight peripheral seal 14 as known from e.g. WO 02/27135 and EP 1 422 204. In that case, the port soldering material 9 should be protected from being heated prior to the evacuation of the void 7 to an extent where the evacuation hole 5 is sealed off. This may be achieved e.g. by using the evacuation head 10 for temporarily shielding the port soldering material 9 from a general heating of the VIG unit 1 for establishing the peripheral seal 14, or the soldering material for the peripheral seal 14 may be heated locally by means of e.g. a laser beam, infrared radiation, microwave or induction heating. Alternatively, other materials may be employed for the peripheral seal 14, such as a metal band seal as disclosed e.g. in US 2015/218877.

In order to obtain the best evacuation of the void 7, the VIG unit 1 is placed in a furnace that heats up the entire unit 1 to a temperature of in the range of 150 to 400° so that volatile substances on the inner surfaces of the two panes 2, 3 during the evacuation of the void 7 will tend to evaporate. The evacuation of the void 7 through the opening 22 in the port soldering material 9 is now effectuated via the evacuation port 13 in the evacuation head 10 until the required vacuum in the void has been reached, in the order of 0.001 millibar or even less.

Figure 5:
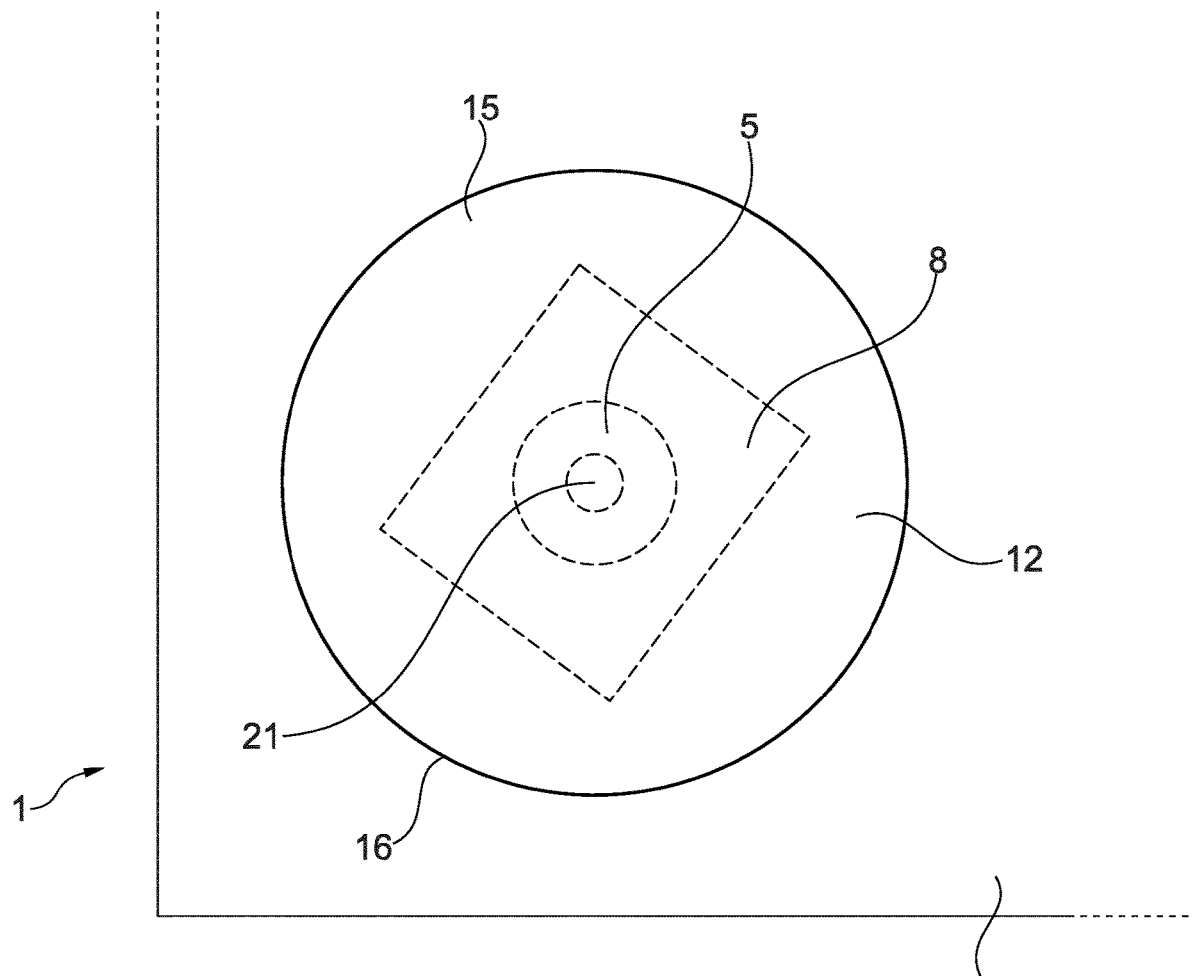
FIG. 5 is a top view of the VIG unit provided with a port seal as shown in FIG. 4.
Figure 6:
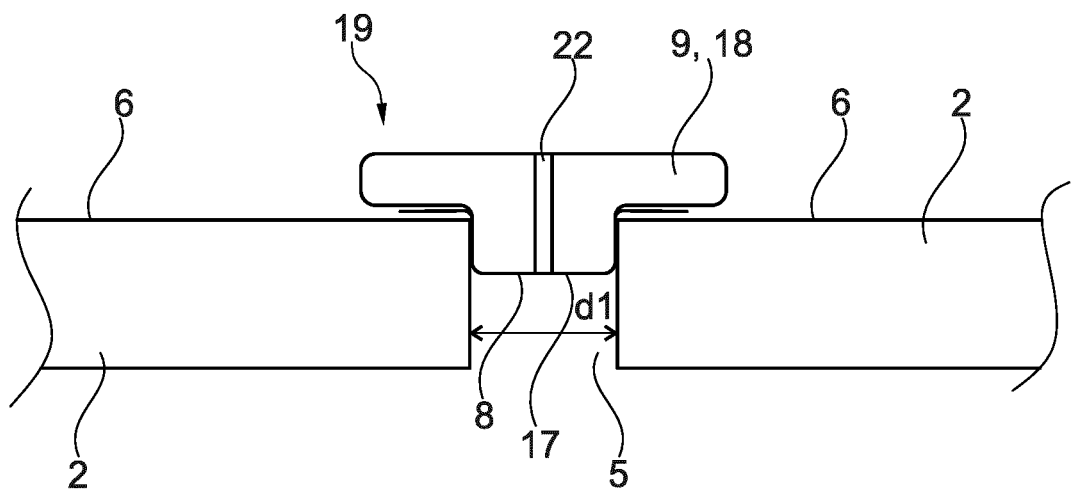
FIG. 6 is a cross-section of a second example of the disclosure, wherein the supporting structure is provided with a first structure.

Hereafter, the port soldering material 9 is heated to a temperature, such as in the range of 300 to 450° to a state where it will flow and come into contact with the upper surface 6 of the first pane 2 in a pattern that encloses the evacuation hole 5 and where the port soldering material 9 will merge across the evacuation hole 5 as shown in FIG. 3, where the softening of the port seal material 9 has resulted in a partial collapse of the opening 22 of the port soldering material 9 and a contact between the upper surface 6 of the first pane 2 and the outer edge of the port soldering material 9. When the port soldering material 9 has flown adequately to complete its merging over the evacuation hole 5 and obtained a sufficient contact with the upper surface 6 of the first pane 2, the temperature is subsequently lowered until the port soldering material 9 reaches a solid condition and forms a continuous body across the evacuation hole 5 and bonds to the upper surface 6 of the first pane 2 in a pattern enclosing the evacuation hole 5 so as to provide an gastight port seal 12 as shown in FIGS. 4 and 5 preventing passage of gas through the evacuation hole 5.

The heating of the port soldering material 9 may be conducted by the heating element 11 which itself is heated to a temperature so that it heats the port soldering material 9 by infrared radiation. Alternatively, the port soldering material 9 may be heated by means of a source directed particularly to the port soldering material 9, such as a laser beam, microwave or induction heating.

By providing the supporting structure 8, preferably in a material that is substantially shape-stable in the temperature range that the port soldering material 9 must be heated to in order to flow and create the port seal 12, it is achieved that the port soldering material 9 will not or only to a limited extent flow down into the evacuation hole 5 and the void 7, and instead remain in the upper part of the evacuation hole and/or at the top of the upper surface 6 of the first pane 2 where it is required to form the port seal 12. Since the first pane 2 is a tempered glass pane 2, the smallest internal diameter d1 of the evacuation hole 5 is at least of the magnitude of the thickness t1 of the first pane 2 according to the present disclosure as discussed previously, which means that the diameter of the evacuation hole 5 typically is as least 4 millimeters, which provides for the heated port soldering material 9 to flow into the evacuation hole 5 and possibly through it into the void 7, since the relatively large diameter of the evacuation hole 5 reduces the effect of the surface tension of the flowing port soldering material 9 as compared to holes of smaller diameters. Thus, the predictability of the outcome of heating the port soldering material 9 to a temperature where it flows is increased by means of providing the support structure 8, which provides for an improved sealing of the evacuation hole 5 by means of the port seal 12.

In the example shown in FIGS. 2 to 5, the supporting structure 8 is depicted as a flat entity. However, in a second example of the disclosure shown in FIG. 6 the supporting structure 8 is provided with a first structure 17, which is suited for engaging with the edges at the upper surface 6 of the first pane 2 around the evacuation hole 5 so as to ensure a correct horizontal positioning of the supporting structure 8 and possibly the bonded assembly 19 with respect to the evacuation hole 5.

Figure 7:
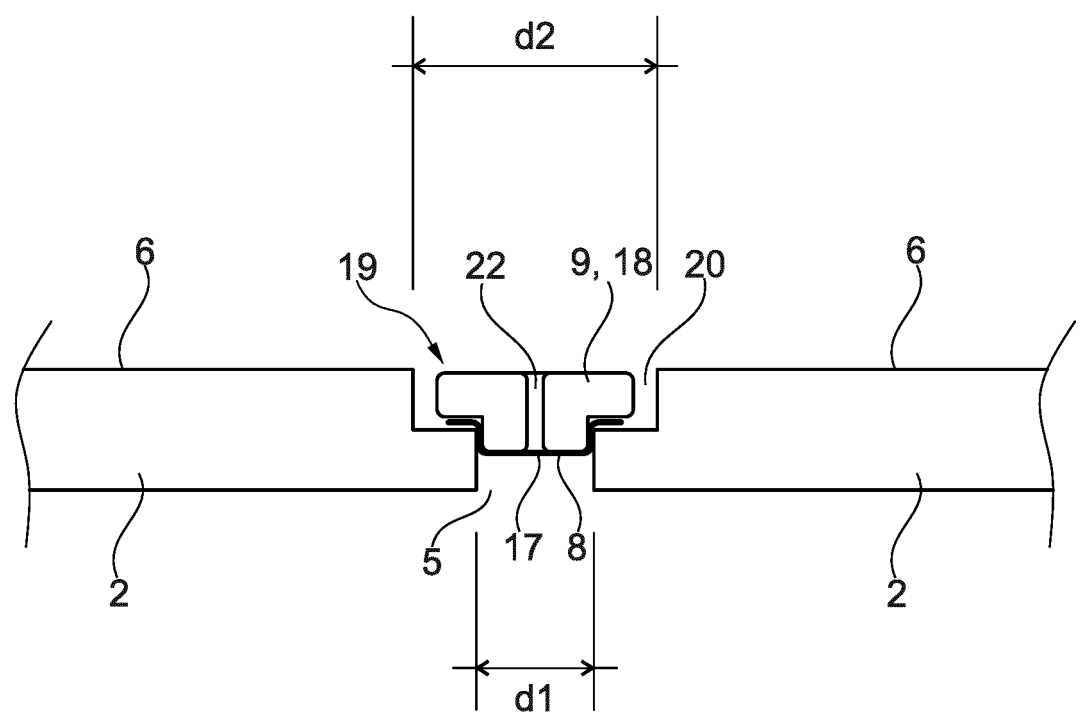
FIG. 7 is a cross-section of a third example of the disclosure, wherein the supporting structure is provided with a first structure and the supporting structure and the pre-form of port soldering material are adapted to fit in a stepped evacuation hole.

A third example of the disclosure is shown in FIG. 7 for use in a stepped evacuation hole 5. The upper part 20 of the evacuation hole 5 nearest the upper surface 6 of the first pane 2 has a wider diameter d2 than the smallest diameter d1 of the evacuation hole 5 so as to be able to accommodate the pre-form 18 of port soldering material 9.

The supporting structure 8 and the pre-form 18 are provided as a bonded assembly 19 as discussed below with reference to FIGS. 14 to 16, but could alternatively be provided as separate items to the evacuation hole 5. By providing the stepped evacuation hole 5 in the first pane 2 it is possible to minimize the extent of the port seal 12 out from the upper surface 6 because the port seal 12 will be at least partly embedded in the upper part 20 of the evacuation hole 5 and thus make the sealing of the evacuation hole 5 less vulnerable to external impacts.

Figure 8:
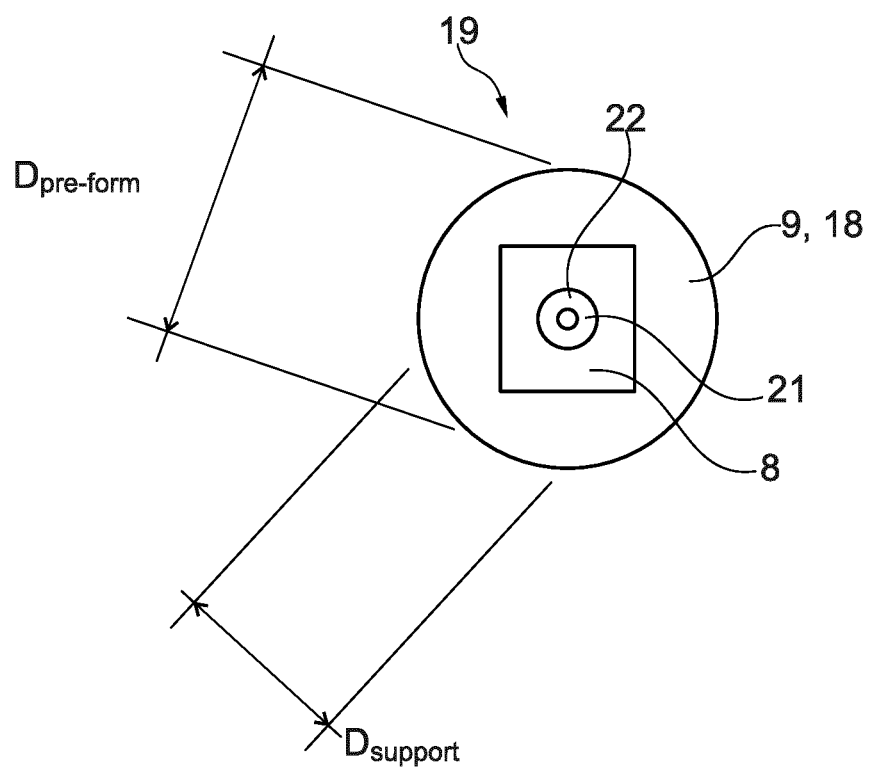
FIG. 8 is an end view of a first example of a supporting structure according to the disclosure.
Figure 9:
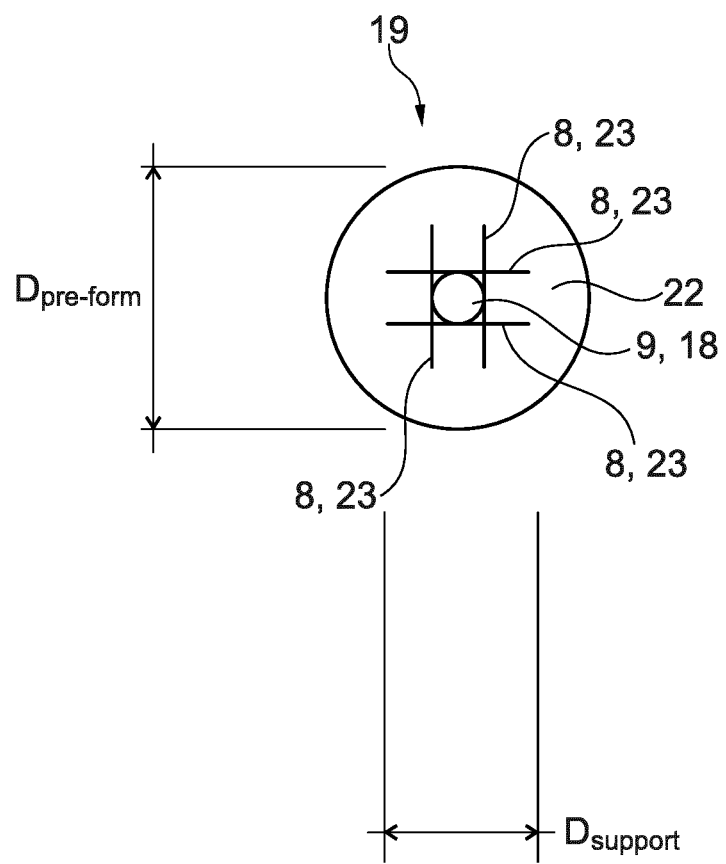
FIG. 9 is an end view of a second example of a supporting structure according to the disclosure.
Figure 10:
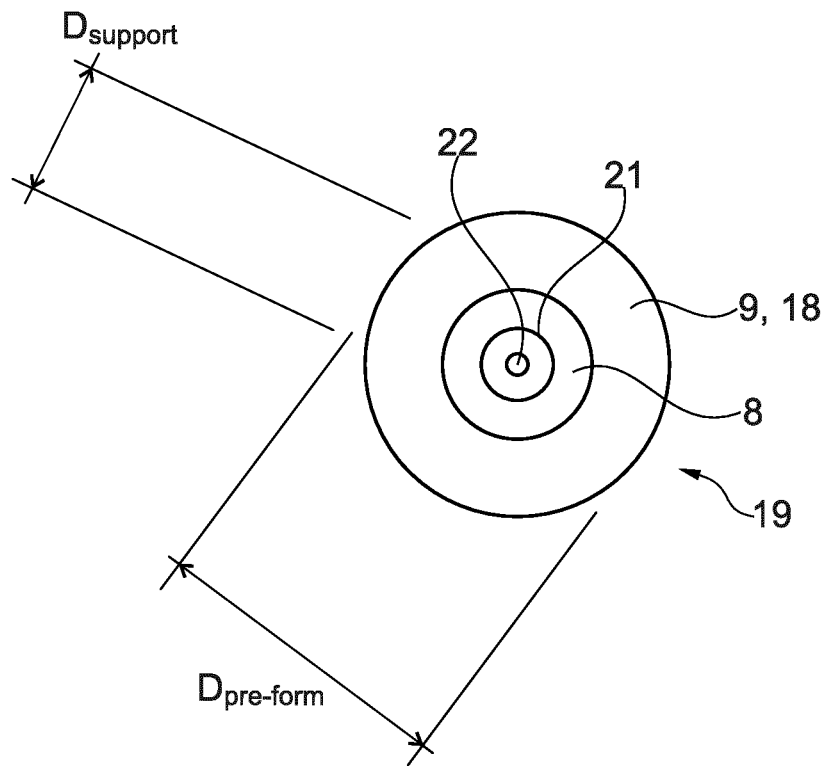
FIG. 10 is an end view of a third example of a supporting structure according to the disclosure.

The supporting structure 8 may take a variety of different forms, of which some examples are shown in end views in FIGS. 8, 9 and 10, i.e. shown from the lower end of an assembly 19 including a pre-form 18 of port soldering material 9. The maximum outer diameter Dsupport of the supporting structure 8 should be sufficient to ensure that the supporting structure 8 will be able to rest on the first pane 2, i.e. the maximum outer diameter Dsupport should exceed at least the smallest internal diameter d1 of the evacuation hole 5, preferably by at least 1 to 2 millimeters. In the examples shown in FIGS. 8-10, the maximum outer diameter Dsupport is 5.6 millimeters, which is suitable for use with an evacuation hole 5 having a smallest internal diameter d1 of 4 millimeters. The pre-form 18 shown has an outer diameter Dpre-form of 12 millimeters.

In FIG. 8 is shown an end view of a first example of a supporting structure 8 according to the disclosure, where the supporting structure 8 is made from a 0.5 millimeters thick foil of titanium cut into a square form of a side length of 4 millimeters. The supporting structure 8 is provided with a central perforation 21 in order to allow for gas to flow from the evacuation hole 5 and through the opening 22 of the pre-form 18.

A second example of a supporting structure according to the disclosure is shown in FIG. 9, comprising four lengths 23 of nickel-plated copper wire. Copper has a suitable thermal expansion coefficient with respect to the one of the glass pane 2 and that of a port seal 12 made from a port soldering material containing glass solder frit, and the copper is plated with nickel in order to prevent a chemical reaction between the glass and the copper. An alternative to nickel-plated copper could be a suitable type of stainless steel.

In FIG. 10 an end view of a third example of a supporting structure according to the disclosure is shown, where a disc-shaped glass supporting structure 8 is provided, made in a glass material with a higher softening temperature than the port soldering material 9, so that the port seal 12 can be formed without deforming the supporting structure 8 to a degree that will compromise its ability to substantially prevent the heated port soldering material 9 from flowing into the evacuation hole 5 beyond the supporting structure 8.

Figure 11:
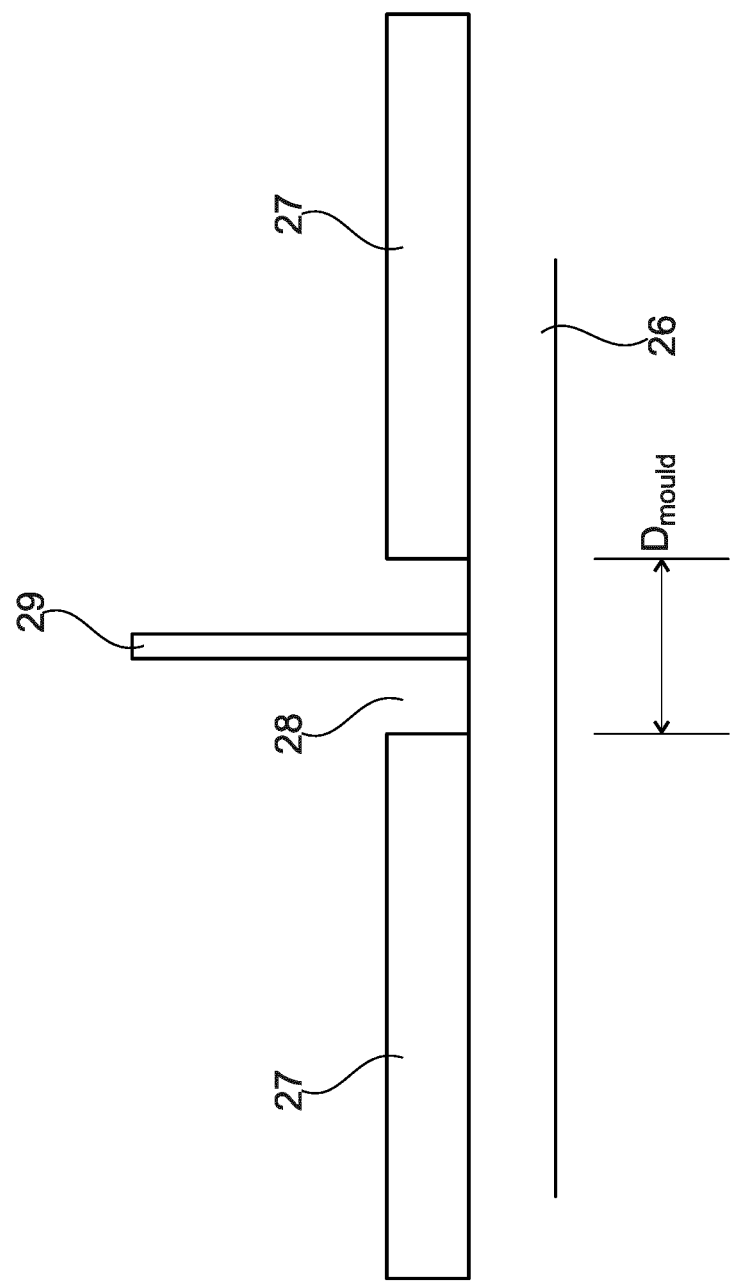
FIG. 11 is a cross-section of a first mold for preparing a bonded assembly according to the present disclosure.

FIG. 11 shows a first mold 25 for preparing a bonded assembly according to the present disclosure, comprising a bottom plate 26, an upper plate 27 having an opening 28 defined therein with a suitable diameter Dmould and a guide 29 arranged extending from the bottom plate 26 and through the opening 28, the guide having a size suitable for forming the opening 22 in the pre-form 18 of port soldering material 9, such as having an outer diameter of 1 to 2 millimeters.

Figure 12:
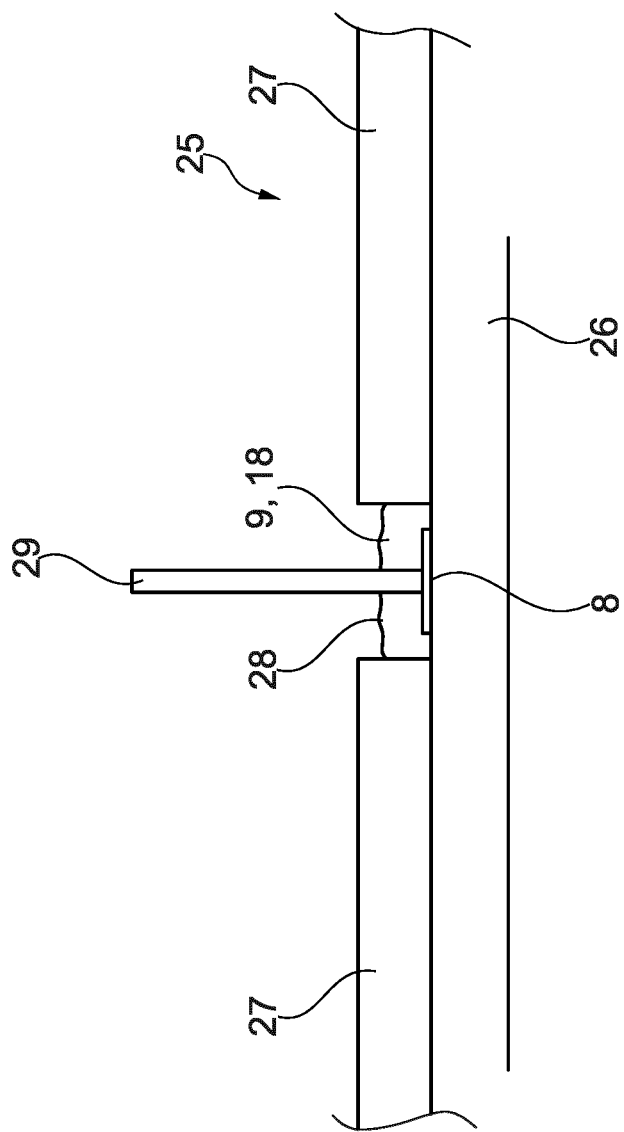
FIG. 12 is the mold of FIG. 11 with the assembly.

The mold 25 of FIG. 11 is shown in use in FIG. 12 with the assembly comprising a supporting structure 8 and port soldering material 9 in the form of a paste containing solder glass frit of about 70 wt %, an organic binder, inorganic fillers and solvents, for example water. The assembly 18 is heated to evaporate the solvents from the paste, which leaves a solid form disc 18 of a port soldering material 9 that binds to the supporting structure 8 and a bonded assembly 19 is thus created. The assembly 19 may be heated further in order to perform a partially of substantially complete burn out of the binder material from the paste, so that the glass frit and the possible inorganic fillers are left or even further to a temperature, such as about 330° C., depending on the glass frit and the fillers, where the material sinters to form a more durable solid structure of the assembly 19. The aim of the heating is to create a bonded assembly 19 that is sufficiently durable to be removed from the mold 25 and be handled for arrangement on a first pane 2 on top of an evacuation hole 5. The type of bonded assembly 19 produced by means of a mold 25 as shown in FIG. 12 is depicted in perspective in FIG. 13 and may be used as shown in FIG. 2.

Figure 13:
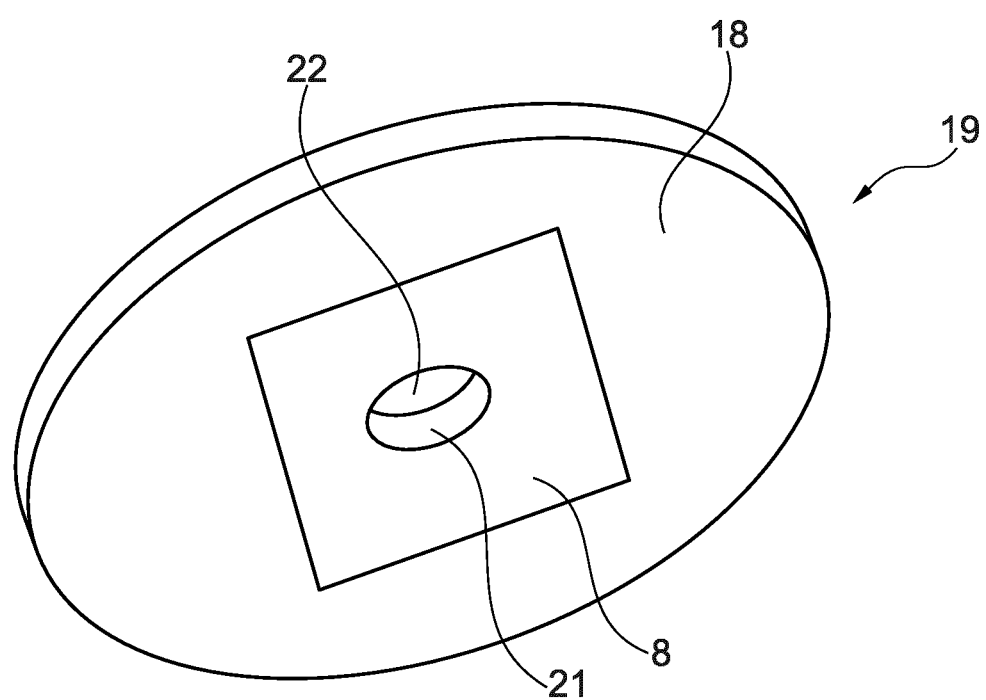
FIG. 13 is a perspective view of the assembly of FIG. 12.

FIG. 13 is a perspective view of the bonded assembly 19 of FIG. 12 when released from the mold 25.

Figure 14:
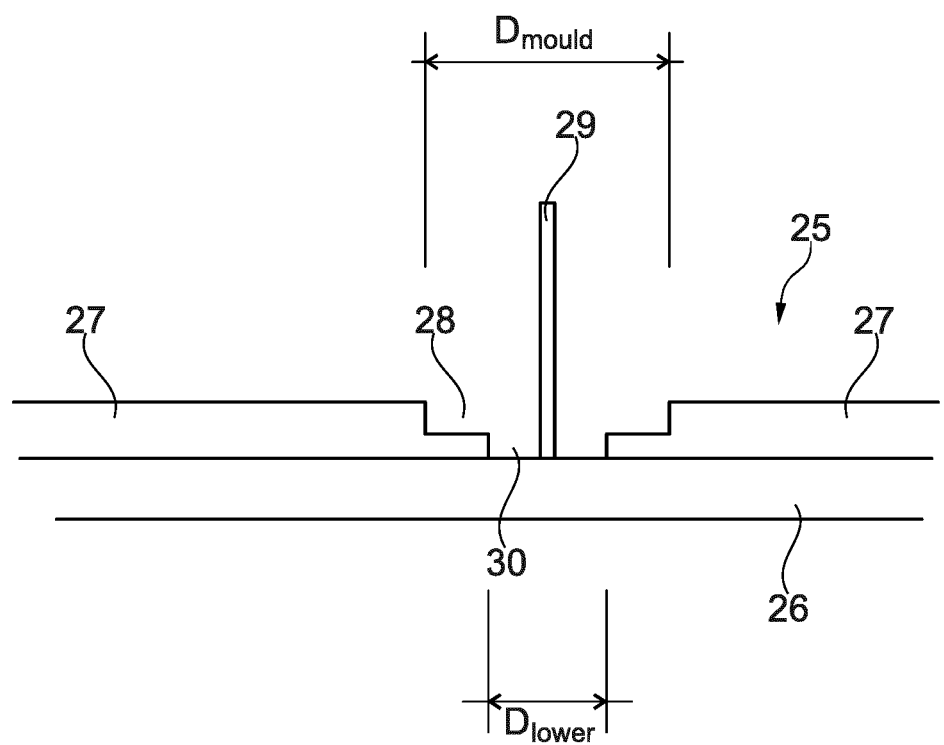
FIG. 14 is a cross-section of a second mold for preparing a bonded assembly according to the present disclosure.
Figure 15:
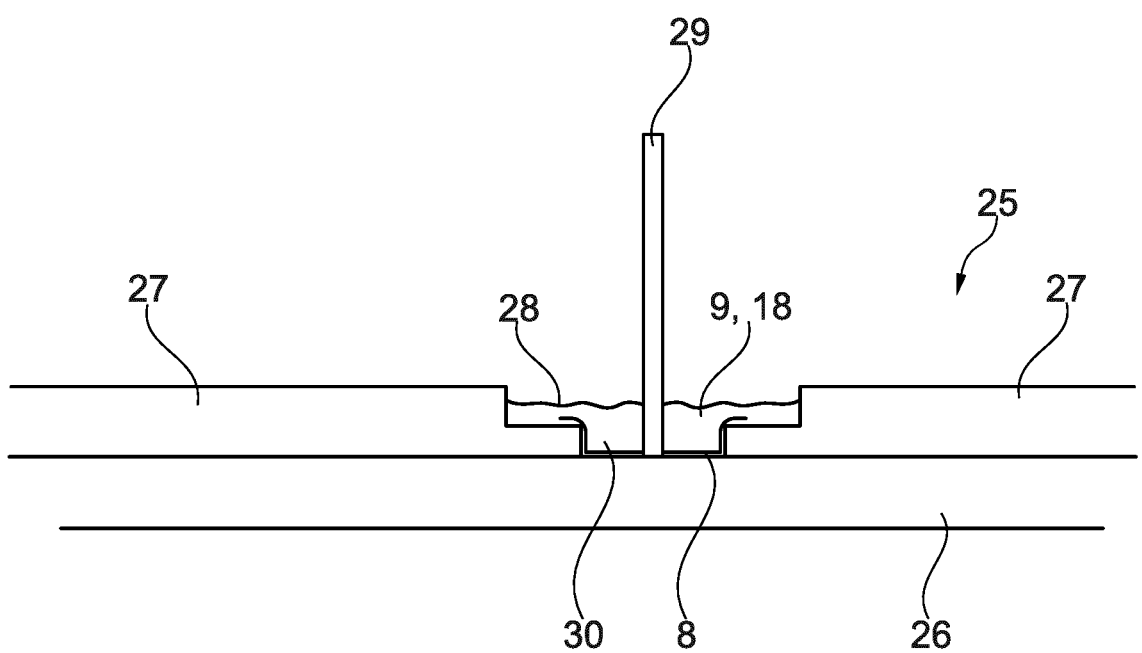
FIG. 15 is the mold of FIG. 14 with the assembly.

A second type of mold 25 is shown in FIG. 14 comprising a bottom plate 26, an upper plate 27 having an upper opening 28 defined therein with a suitable diameter Dmould and a lower opening 30 defined therein. The lower opening 30 has a diameter Dlower which is smaller than the opening diameter Dmould of the upper opening 28. A guide 29 arranged extending from the bottom plate 26 and through the opening 28, 30, the guide having a size suitable for forming the opening 22 in the pre-form 18 of port soldering material 9, such as having an outer diameter of 1 to 2 millimeters. The diameter Dlower of the lower opening 30 is similar to the smallest internal diameter dl of the evacuation hole 5 in the VIG in which the assembly 19 is supposed to be used so that the assembly 19 will fit.

The mold 25 of FIG. 14 may be used similarly to the mold 25 shown in FIG. 11 as disclosed above with reference to FIG. 12. The mold 25 of FIG. 14 arranged with a supporting structure 8 and port soldering material 9 in the form of one or more pastes comprising glass solder frit is shown in FIG. 15. The supporting structure 8 is equipped with a first structure 17 as discussed previously to ensure a correct horizontal positioning of the assembly 19 with respect to the evacuation hole 5 of the first pane 2 on which the assembly 19 is being applied. The mold 25 of FIG. 14 is used for producing a bonded assembly 19 as shown in FIG. 16. The supporting structure 8 comprises four lengths of wire 23 similarly to the example shown in FIG. 7 and each of the lengths of wire 23 has been provided with suitable bends to form the first structure 17, which is apparent from the perspective view of FIG. 16.

Figure 16:
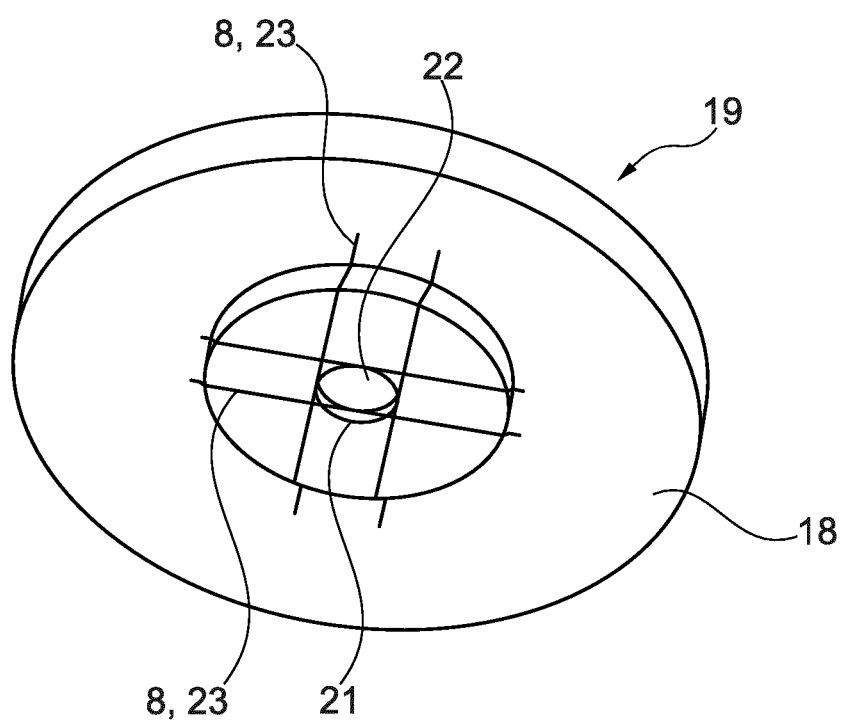
FIG. 16 is a perspective view of the assembly of FIG. 15.

The bonded assembly 19 of FIG. 16 may be used with an upper pane 2 of a VIG unit 1 as shown in FIG. 5, where the evacuation hole 5 has a constant diameter d1 or it may be used with an upper pane 2 with a stepped evacuation hole 5 as shown in FIG. 7.

Generally, the soldering material 9 may be a pre-form solid body 18 from solder glass frit which for example is dried or heated (known as sinter) to form the solid body 18. The pre-form 18 rests on the supporting structure 8 which is shape-stable at the melting point of the pre-formed soldering material 18. Hereby, an enhanced evacuation hole 5 cover is provided with good positioning.

Optionally, the supporting structure 8 which is shape-stable at the melting point of the soldering material 9 may be joined to the pre-formed solid body 18 of solder glass frit.

The supporting structure 8 can also support a getter material. Getter helps absorbing the impurities in the void and maintaining low pressure.

The invention claimed is:

1. A vacuum insulated glazing (VIG) unit comprising:
   first and second substantially parallel panes of glass, a plurality of pillars and a peripheral seal provided between the first and second panes, where in the first pane there is provided an evacuation hole;
   a gastight port seal bonding to an outer surface of the first pane in a pattern that encloses the evacuation hole and forming a continuous body across said evacuation hole and preventing passage of gas to a void between the first and second panes; and
   a supporting structure supporting on the outer surface of the first pane and extending over an opening of the evacuation hole, the supporting structure being shape-stable at a melting point of a material forming the seal,
   wherein the supporting structure is provided in a form of a perforated foil, wherein a perforation allows for passage of gas through the evacuation hole prior to a heating of a port soldering material during manufacturing of said vacuum insulated glazing (VIG) unit; and
   wherein the supporting structure is formed with a first structure which engages with the evacuation hole so as to ensure a correct horizontal positioning of the supporting structure with respect to the evacuation hole.

2. A vacuum insulated glazing (VIG) unit according to claim 1, wherein said first and second substantially parallel panes are made from tempered glass.

3. A vacuum insulated glazing (VIG) unit according to claim 1, wherein the supporting structure is in abutment with the first pane.

4. A vacuum insulated glazing (VIG) unit according to claim 1, wherein the supporting structure is made from a metal or a metal alloy selected from titanium, stainless steel, nickel plated copper and an iron-nickel-cobalt alloy.

5. A vacuum insulated glazing (VIG) unit according to claim 1, wherein a thermal expansion coefficient of the supporting structure is substantially the same as for the port seal.

6. A vacuum insulated glazing (VIG) unit according to claim 1, wherein a thermal expansion coefficient of the supporting structure is substantially the same as for the first pane.

7. A vacuum insulated glazing (VIG) unit according to claim 1, wherein a thickness of the first pane is in a range of about 3 to 6 millimeters.

8. A vacuum insulated glazing (VIG) unit according to claim 1, wherein a smallest internal diameter of the evacuation hole is at least 2.5 millimeters.

9. A vacuum insulated glazing (VIG) unit according to claim 1, wherein the port seal comprises a low-melting temperature glass solder and is substantially lead-free.

10. Window comprising a frame and a vacuum insulated glazing (VIG) unit according to claim 1 enclosed in the frame.

* * * * *